United States Patent Office 3,669,589
Patented June 13, 1972

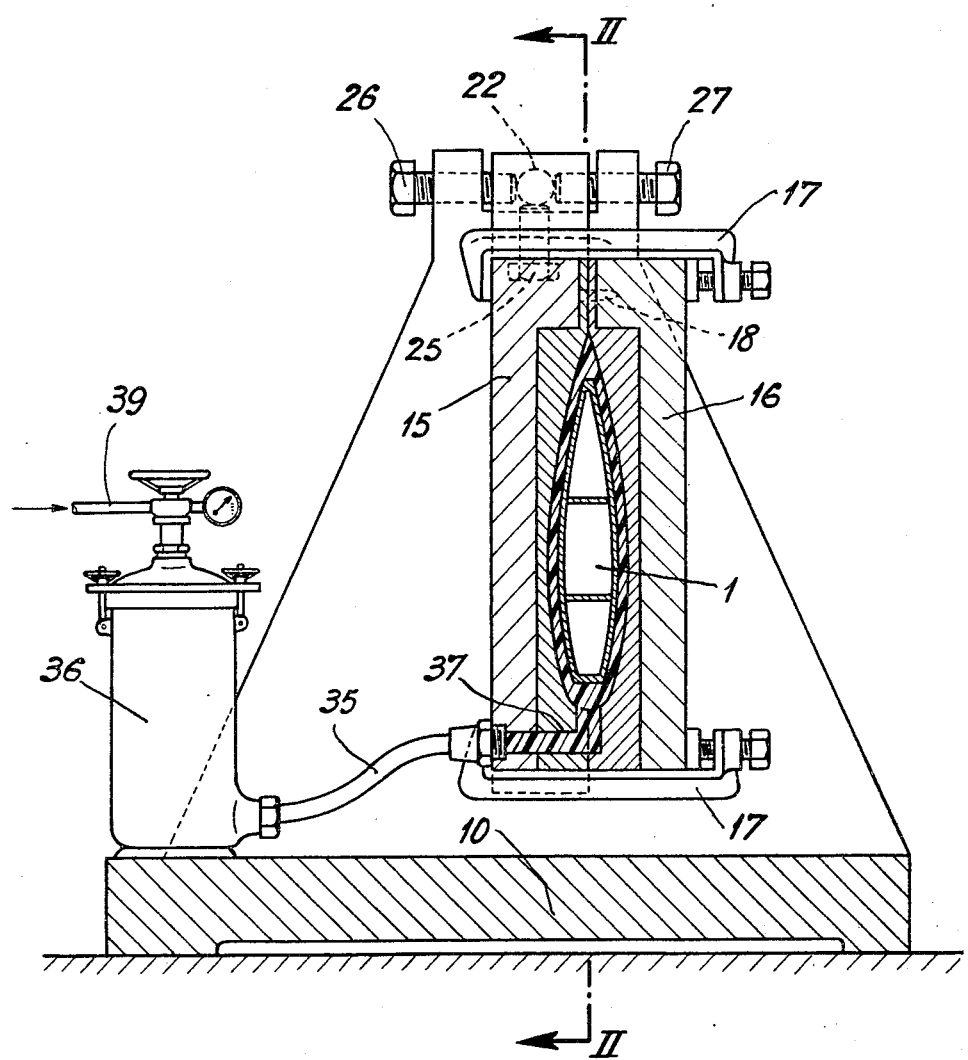

3,669,589
APPARATUS FOR THE PRODUCTION OF MEMBERS HAVING A SMOOTH SHEATHING AND OF ACCURATE SHAPE, AND THEIR APPLICATIONS TO THE STRUCTURAL ELEMENTS OF SUBMERGED FOILS
Andre Jules Edmond Bordat, Paris, France, assignor to Societe Nationale Industrielle Aerospatiale, Paris, France
Filed Mar. 31, 1970, Ser. No. 24,200
Claims priority, application France, Apr. 11, 1969, 6911246
Int. Cl. B29c 1/00
U.S. Cl. 425—116                                                5 Claims

ABSTRACT OF THE DISCLOSURE

The disclosure is particularly concerned with the production of submerged struts for hydrofoil craft. The struts are produced by sheathing a basic element with plastics. The sheathing is carried out in a mould which has at least one degree of freedom in relation to the structure to be sheathed.

---

Figure 1:
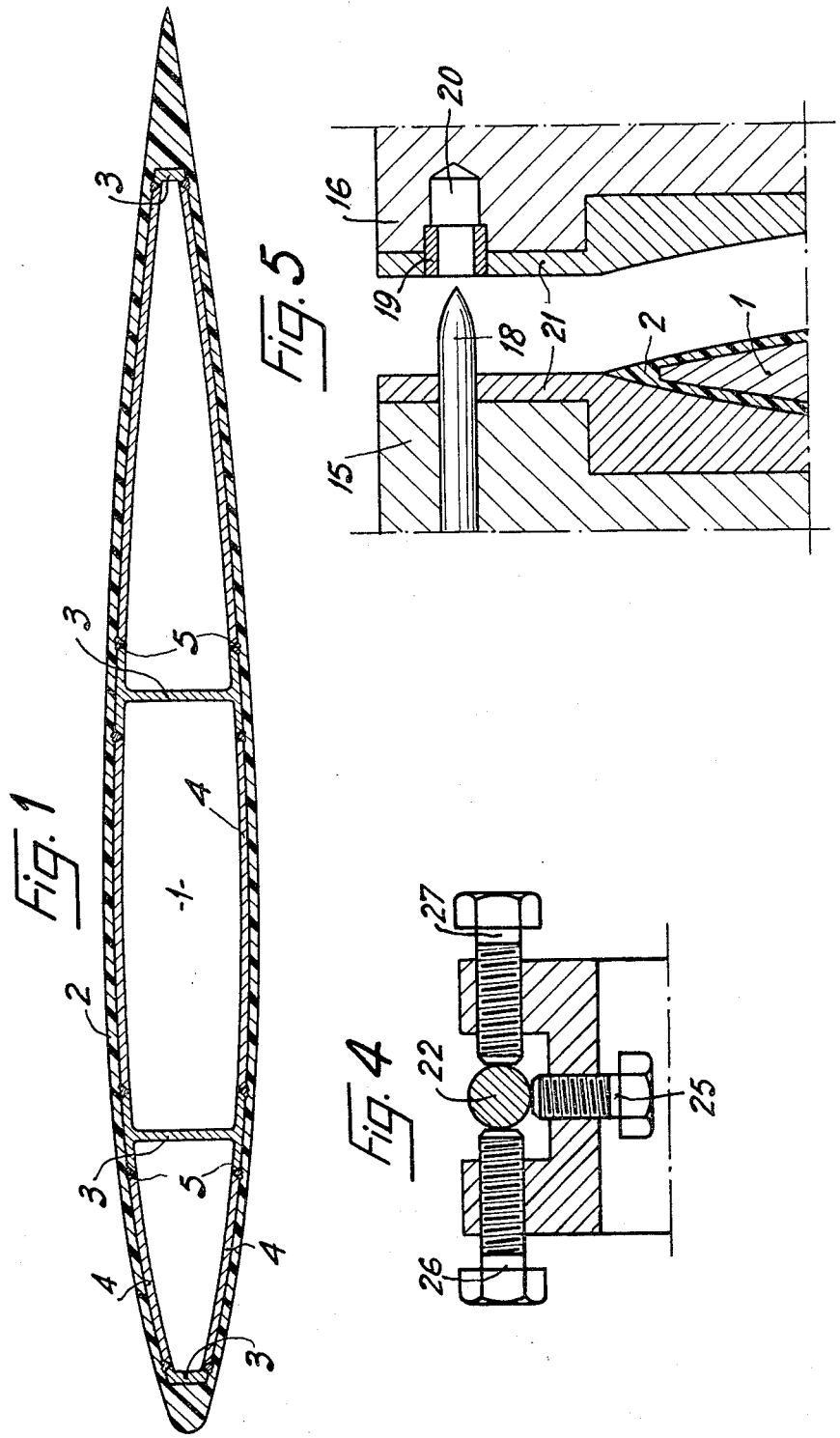

This invention relates to a method of and apparatus for sheathing structures to give smooth continuous surfaces of a perfectly defined form to the resulting members.

The invention is applied more particularly, but not exclusively, to the production of submerged foils or support struts for the latter, such struts and foils being provided for hydrofoil craft.

A foil profile moving at speed in water has a lift per unit area as a result of the density of the fluid in which it moves, so that a moving craft can be held above the water surface, without floating, using small-area foils.

Since the theoretical drag is relatively small, the speed of hydrofoils can be very high.

However, the submerged foils and their support struts must be perfectly smooth, of accurately defined hydrodynamic shape, and withstand erosion due to cavitation.

Because of the density of the fluid, any surface defects considerably increase the drag effects. Also, such defects or faults may result in local pressure reductions which result in cavitation, with appreciable erosion effects.

French Pat. No. 1,021,746 discloses a method producing members sheathed with smooth surfaces, comprising coating a structure with a plastic sheathing, preferably a polymerisable plastic, and moulding the same by means of a finely polished mould of perfect shape. To this end the structure (or the mould wall) is coated with a suitable layer of the sheathing material and the assembly is then engaged and forced into the mould.

This system does not give a reliably satisfactory distribution of the sheathing material over the entire structure and does not ensure that there is no direct contact, at least local, between the structure and the mould, with the effect of eliminating any coating at the points involved.

Nor is it possible to mould the sheathing material by pressure injection into the mould.

The method according to the invention obviates these disadvantages.

According to the invention, the structure to be sheathed is fixed to a support and the mould enclosing the structure is fixed to the same support by members which give the mould at least one degree of freedom in relation to the structure to be sheathed, while a deformable seal is interposed at each point where the structure emerges from the mould and between these two parts.

In this way it is possible, even in the case of structures which are slightly different from one another and which have faults such as warping, a twist, or a slight sag, to distribute and balance the gap between the mould and the structure over the entire extent of the mould, and finally obtain finished parts which are strictly identical as regards external form and without any surface defects.

In one advantageous embodiment of the invention, the mould is supported with its six possible degrees of freedom, i.e. it is movable with displacement along three axes arranged as a trihedron (preferably trirectangular) and it can turn about these three axes.

However, this complete freedom of movements is not always essential. Thus in the case of a structure having a general rectilinear and faired shape, the mould may be movable in just the longitudinal direction. It may also be movable just as regards rotation about an axis. In both these latter cases the mould has only one degree of freedom.

All the degrees of freedom between one and six may be provided for the mould.

The means allowing the various movements of the mould may support the latter isostatically, more particularly when the mould is rigid.

More particularly, the mould may be suspended about two points which are themselves movable to give the various degrees of freedom required and it may comprise a guide system the position of which is adjustable at a third point. It can also be borne at three points, all three being movable in any direction.

The mould fixing may also be hyperstatic, e.g. to facilitate position adjustment, or, when the mould is elastically deformable, to adapt it to the specific shape of the structure to be sheathed.

In this latter case, the sheathed members are of course not strictly identical.

The mould may have just one passage aperture for the structure. Preferably, to facilitate relative positioning of the mould and the structure, the mould has at least two apertures and an adjustment can be made at the two points where the structure passes through the mould. The structure portions situated outside the mould are thus not sheathed. These portions may, for example, be fixing means for which no sheathing is required, or alternatively be temporary means which are subsequently dispensed with.

As indicated above, the invention is applied more particularly to struts and foils for hydrofoils. In that case, the resistant structures may be of metal and be formed, for example, by connecting section members together. More particularly, these structures may consist of welded sheets and metal sections. These structures may also be of plastics reinforced by resistant and very fine fibres grouped into bunches, e.g. glass fibres or boron fibres.

For application to hydrofoils, the plastic sheathing material may be an elastomer having a high Shore hardness, e.g. a polyurethane having higher resistance to abrasion than natural rubber or other synthetic elastomers.

The Shore hardness may be from 60 to 90 and the adhesion of the structure must be greater than the tearing strength of the sheathing in order to obviate peeling from the structure.

The accompanying drawings illustrate one example of performance of the invention.

Figure 2:
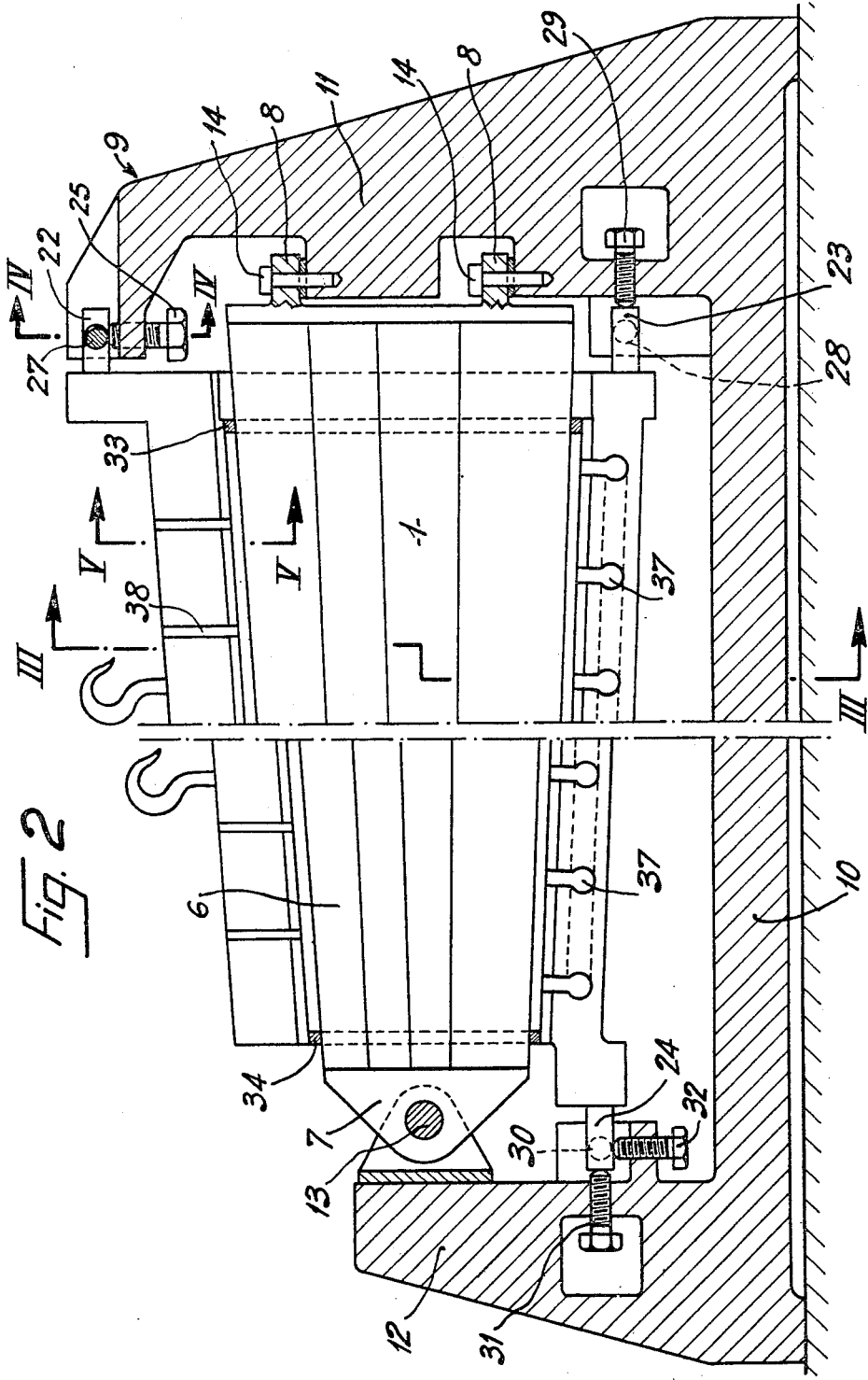

In the drawings:
FIG. 1 is a cross-section of a hydrofoil strut or foil.
FIG. 2 is a longitudinal section on II—II in FIG. 3 of an example of a machine for sheathing a rigid structure with plastic material or elastomer.
FIG. 3 is a section on III—III in FIG. 2.
FIG. 4 is an enlarged section on IV—IV in FIG. 2.
FIG. 5 is a section on V—V in FIG. 2.

The section shown in FIG. 1, which may be the section of a submerged aerofoil or a support or strut bearing such an aerofoil, shows that the areofoil or strut has internally a rigid structure 1 to which a smooth covering 2 of accurate hydrodynamic configuration is applied. The structure 1 comprises a number of double T or U section members which are connected with metal sheets 4 by connecting welds 5 to form a box girder.

As manufactured, a structure of this kind is unsuitable for the application in question, because the general form is inaccurate and far from being a pure hydrodynamic profile; also, the welds form rough projections on the structure surface and the metal sheets and section members may have local deformations; lastly, the connecting welds may produce deformation in the structure, e.g. twisting, flexure, local depressions, and so on.

An accurate hydrodynamic configuration which adjusts to the deformations of the internal structure and cancels the same may be obtained by moulding over this inner structure with the apparatus shown in FIGS. 2 to 5. The apparatus illustrated is suitable for moulding over a support or strut 6 for a hydrofoil, the ends of which have fixing means 7 and 8 for its ultimate use. In the case of an aerofoil, these fixing means may be detachable or be fitted to the said aerofoil and be removed after the moulding over operation.

The fixing means are used to hold the structure 1 in a fixed position on a frame 9 comprising a base 10 and two facing uprights 11 and 12. The fixing means 7, in the form of a yoke, is thus held by a pin 13 passing through a lug secured to the upright 12, while the fixing means 8 are secured to the upright 11 by means of bolts 14.

The frame 9 is also used as a support for the mould for the over-moulding operation. The mould is in two parts 15 and 16 connected by cramps 17; the two parts are accurately centered relatively to one another by studs 18 (FIG. 5) on the mould part 15, said studs engaging in bushes 19 accommodated in bores 20 in the part 16. As will be apparent from FIG. 5, the facing surfaces of the parts 15 and 16 may have hard and polished metal coverings 21 to improve the results.

Adjacent the upright 11, the mould part 15 has two parallel support rods 22 and 23 at the top and bottom respectively while adjacent the upright 12 it has a single rod 24.

Referring to FIG. 4 the rod 22 rests on an adjusting bolt 25 and can be adjusted laterally in both directions by adjusting bolts 26 and 27. Similarly, rod 23 is clamped between two horizontal bolts 28 (only the section of which is visible) and it abuts a horizontal bolt 29 perpendicular to the first two. The rod 24 rests on a vertical bolt 32 and is clamped between two horizontal bolts 30 (only the section of which is visible) and abuts the horizontal bolt 31 perpendicular to the plane of the first three bolts.

It will be seen that the mould suspended in this way has the six degrees of liberty of a body free in space, with a limited amplitude. If the bolts 29 and 31 are actuated, the mould is movable with a longitudinal displacement. Taking a transverse plane, the mould is movable with a displacement in two rectangular (vertical and horizontal) directions of this plane by means of the support bolts 25 and 32 in respect of the vertical direction, and the pair of bolts 26 and 27 and the pairs of bolts 28 and 30 in respect of the horizontal direction.

A combined operation in opposite directions of the pairs of bolts (26 and 27 on the one hand, and 28 on the other hand) accompanied by the pair of bolts 30 gives a rotation about the longitudinal axis. A combined operation in opposite directions of the pairs (26, 27 and 28 on the one hand, and 30 on the other hand) gives a rotation about a vertical axis. A rotation of the support bolts 25 and 32 in opposite directions gives a rotation about a horizontal axis perpendicular to the longitudinal axis.

There is therefore complete freedom of adjustment of the position of the mould in relation to the structure 1 in order to balance the gap between the latter and the inner surface of the mould round the entire structure 1.

Thus even if there are any faults in the assembly of the structure 1, a substantially uniform distribution of the layer of covering material can be obtained over the entire extent of such covering.

It will be apparent that the action of the bolts 25 to 32 gives an isostatic support for the mould, which is perfectly satisfactory, if as in the example illustrated, the mould is rigid enough not to be deformable. The mould is in fact borne pendulum-fashion by the two bolts 25 and 32 which are individually adjustable and the other bolts enable its position to be adjusted along the axis of the support thus defined.

By similar arrangements it would be possible to use a hyperstatic mould support either for adjustment facilities or, when the mould used is elastically deformable, to allow for more complex defects in the structure which is to be moulded over or "sheathed." In the latter case, however, the resulting sheathed members would not all be strictly identical as regards dimensions and external shape.

Conversely, if the parts to be sheathed have relatively simple shapes and few faults, the number of degrees of liberty of the mould can be limited. For example, the adjustment facilities could be limited just to the bolts 29 and 31 (longitudinal displacement) or 25 and 32 (displacement and rotation), and so on.

Plastic seals 33 and 34 are disposed between the mould wall and the structure to be sheathed, at the places where the structure emerges from the mould. These seals can act as guides for adjustment of the relative position of the mould and the member to be sheathed.

In view of the displaceability of the mould, the latter is filled by means of a flexible connection 35 between the container for the sheathing material 36, which is pressurised by compressed air supplied via pipe-line 39 and the inner space of the mould into which distribution ducts 37 lead. These ducts are arranged to give the most homogeneous possible distribution of the plastic material around the structure 1 so that the mould is filled by the sheathing material rising uniformly inside the mould.

Vents 38 enable the air to escape. The distribution of the vents is advantageously the same as the distribution of the sheathing material supply apertures; in the embodiment illustrated, a vent is disposed between each pair of such apertures. These vents may also be connected by flexible conduits to be vacuum source for de-gasification of the mould and the sheathing material while it is being supplied to the mould.

To ensure that the sheathing material rises as uniformly as possible despite variations in passage sections, the rate of flow of air from the said vents may advantageously be controlled.

As indicated in the preamble, the invention is suitable more particularly for the production of struts and foils for hydrofoils. After a foil has been connected to one or more struts, the connection between the strut and the foil is advantageously faired. This fairing can also be carried out by sheathing with plastic coating material under the same conditions as those used for sheathing a foil or strut.

I claim:

1. Apparatus for sheathing an elongated structure with a layer of hardenable fluid material moulded over said structure comprising two facing stationary uprights for fixing the ends of said structure, said uprights each having a substantially horizontal abutment; an openable mould comprising at least two joined parts and means for maintaining said mould in closed condition for surrounding the portion of said structure comprised between its ends, at a distance, said mould having end projections leaning on said abutments for supporting said mould in pendulum fashion; at least one adjustable side stop carried by one upright for adjusting the position of the mould with respect to said structure and uprights and rendering said mould stationary; a deformable seal interposed between each mould end and structure end; a source of said fluid material; and flexible conduit means connecting said source with said moulds.

2. Apparatus according to claim 1, wherein the horizontal abutments are individually vertically adjustable.

3. Apparatus according to claim 1, wherein each of the two mould end projections resting on the abutments is held between two adjustable stops, the line of action of which is horizontal and perpendicular to the vertical plane containing both abutments.

4. Apparatus according to claim 1, wherein the mould is longitudinally adjusted and clamped between two adjustable stops acting substantially in the direction of the straight line connecting the two abutments.

5. Apparatus according to claim 1, wherein the mould has at the bottom a distribution ducting connected to the flexible conduit and leading into the mould cavity via a plurality of apertures at the same level, while the top of the mould has a plurality of vents having a similar distribution to that of the said apertures.

References Cited

UNITED STATES PATENTS

| | | | |
|---|---|---|---|
| 3,479,696 | 11/1969 | Balhouse | 249—88 X |
| 3,412,431 | 11/1968 | Lemelson | 18—DIG 50 |
| 791,648 | 6/1905 | Richards | 18—36 |
| 1,282,210 | 10/1918 | Fromm | 18—34.1 |
| 1,644,586 | 10/1927 | Heltzel | 249—159 X |
| 3,271,502 | 9/1966 | Wentorf | 18—16 R X |

J. SPENCER OVERHOLSER, Primary Examiner

M. O. SUTTON, Assistant Examiner

U.S. Cl. X.R.

249—159; 425—129, 109